United States Patent [19]
Brubaker

[11] 3,824,773
[45] July 23, 1974

[54] AUTOMATIC RAKE
[76] Inventor: Harry E. Brubaker, 560 E. Lawn, Urbana, Ohio 43078
[22] Filed: Aug. 21, 1972
[21] Appl. No.: 282,027

[52] U.S. Cl.................................... 56/369, 56/16.7
[51] Int. Cl............................................. A01d 81/00
[58] Field of Search .......... 56/16.4, 16.6, 369, 373, 56/16.7

[56] References Cited
UNITED STATES PATENTS

| | | | |
|---|---|---|---|
| 317,602 | 5/1885 | Williams | 56/369 |
| 344,803 | 7/1886 | Barton | 56/369 |
| 2,989,833 | 6/1961 | DeFine | 56/16.6 |
| 3,125,844 | 3/1964 | Beyer | 56/16.4 |

Primary Examiner—Antonio F. Guida

[57] ABSTRACT

A rake for raking a lawn or other grounds, the device consisting of frame supported upon wheels so that it can travel across the ground, a control handle extending rearwardly upwardly from the frame for being held by an operator walking behind, the device being powered either by a gasoline engine or electric battery and including a series of individual hand type rakes operated by a crank shaft so as to move through a raking motion of the ground.

1 Claim, 1 Drawing Figure

PATENTED JUL 23 1974  3,824,773
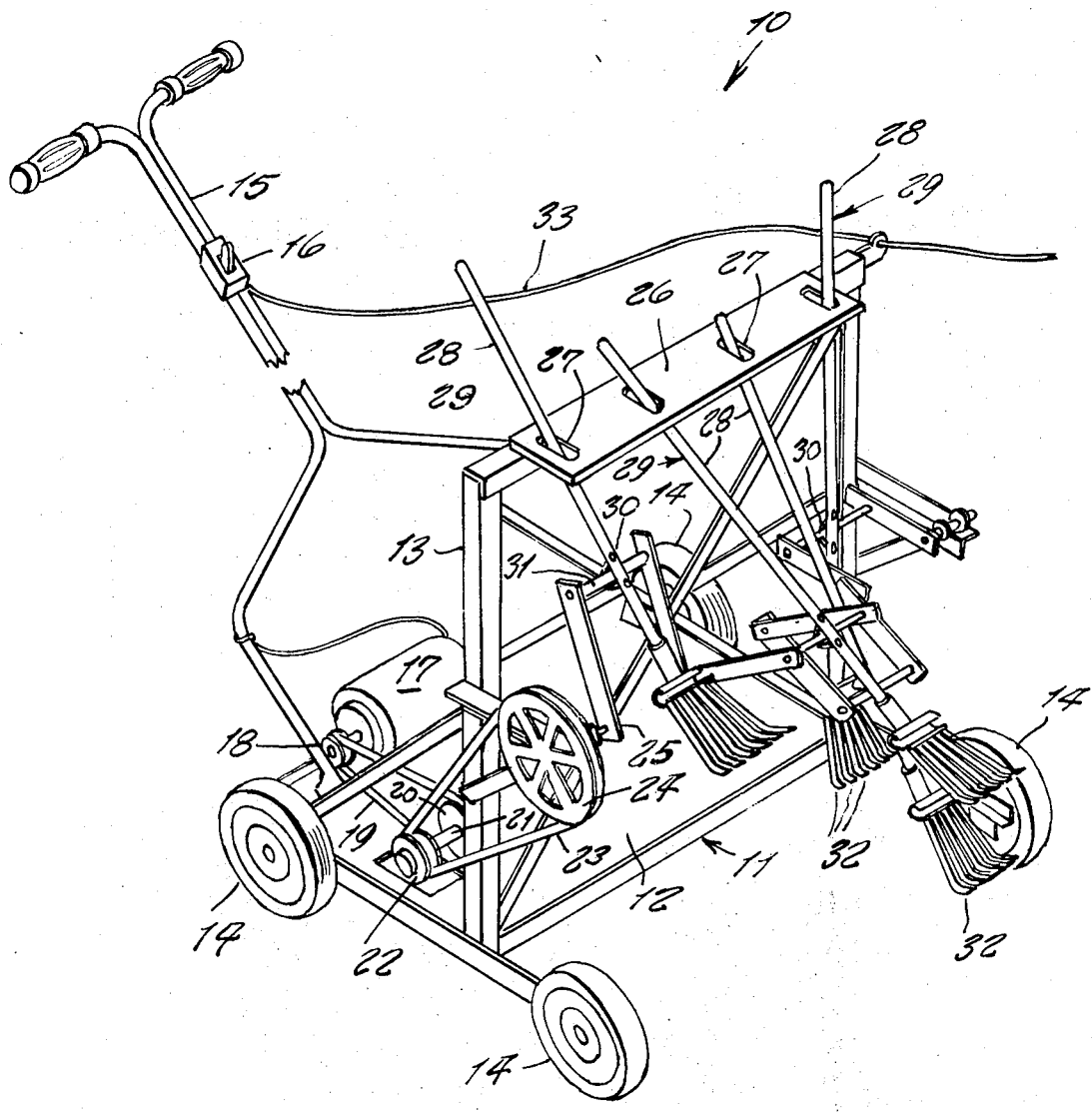

AUTOMATIC RAKE

This invention relates generally to powered machines used in maintaining a lawn or other grounds.

It is well known that hand raking is a slow operation as well as being physically tiring so that the maintenance of larger grounds can be costly in labor. This is objectionable and the situation is in want of an improvement.

Accordingly, it is a principal object of the present invention to provide an automatic rake that eliminates the slow, tiring and more costly raking by hand.

Another object is to provide an automatic rake that is comparable in size to a conventional power lawn mower, so that it would be ideal to be owned by homeowners in raking leaves and twigs from a lawn or driveway.

Another object is to provide an automatic rake that can be powered either by a gasoline engine or electric battery mounted on the device.

Other objects are to provide an automatic rake which is simple in design, inexpensive to manufacture, rugged in construction, easy to use, and efficient in operation.

These and other objects will be readily evident upon a study of the following specification and the accompanying drawing, wherein:

The sole FIGURE is a perspective view of the present invention.

Referring now to the drawing in detail, the automatic rake 10 is shown to include a frame 11 consisting of platform 12 and upstanding scaffold 13, the frame being carried upon wheels 14. A rearwardly inclined handle 15 secured to the frame has a control 16 mounted on it for easy reach by an operator.

A power unit 17 mounted on the platform may either be electrically or gasoline operated. The drawing shows it as an electric motor. The unit 17 drives a pulley 18, which by an endless belt 19 drives pulley 20 on a shaft 21. Another pulley 22 on shaft 21 drives by endless belt 23 a pulley 24 on a crankshaft 25 supported from a side of the scaffold.

A horizontal plate 26 secured on top of the scaffold has slots 27, and the upper end of handles 28 of a series of hand type rake units 29 freely slide and pivot therein. A lower end of each handle 28 is attached pivotally at 30 to a throw arm 31 of the crankshaft. A lower end of each handle supports rake tines 32 in a fanned out arrangement.

A power cable 33 to control 16 can be used for outside electric power to the unit 17.

In use, as the crank shaft rotates, the rake units sweep the ground area in front of the device. The unit 17 can through a clutch also power the wheels 14 for travel on the ground.

While various changes may be made in the detail construction, it is understood that such changes will be within the spirit and scope of the present invention as is defined by the appended claims.

I claim:

1. In an automatic rake, the combination of a frame carried on wheels for travel over a ground, said frame including a platform and an upstanding scaffold, said frame including a handle for being steered by an operator, and a control unit on said handle, a power unit on said platform driving a rotatable crankshaft, a series of hand-type rakes activated by said crankshaft, each rake including an elongated handle and a row of raking tines, the lower ends of said handles being pivotally attached to cranks of said crankshaft so to impart a rotating motion to said raking tines adjacent thereto, a horizontal plate on said scaffold having a row of slots therethrough and through each of which an upper end of one of each said handles is received so to pivot in said slot and slide longitudinally therein as said crankshaft rotates, so to cause said tines to move in a raking action.

* * * * *